United States Patent
Xue et al.

(10) Patent No.: US 12,540,089 B2
(45) Date of Patent: Feb. 3, 2026

(54) SYSTEM AND METHOD FOR CONTROLING AMOUNT OF LIQUID CARBON SOURCE RELEASED TO CONSTRUCTED WETLAND

(71) Applicants: Ocean University of China, Qingdao (CN); Shandong Academy of Environmental Sciences and Environmental Engineering Co., Ltd., Jinan (CN); Shandong Academy of Environmental Sciences Co., Ltd., Jinan (CN)

(72) Inventors: Moxi Xue, Jinan (CN); Junjie Yang, Jinan (CN); Jinyong Zhang, Jinan (CN); Ganglin Lyu, Jinan (CN); Jingjing Shang, Jinan (CN); Song Zhao, Jinan (CN); Boya Pan, Jinan (CN); Wenquan Li, Jinan (CN); Tianyu Mou, Jinan (CN); Guangzhou Yu, Jinan (CN); Ran Che, Jinan (CN); Xingsheng Kang, Jinan (CN); Yuming Jing, Jinan (CN); Qiang Su, Jinan (CN); Jielin Li, Jinan (CN); Tianli Ma, Jinan (CN); Dan Xu, Jinan (CN); Xiaorui Zhang, Jinan (CN); Jianhua Lu, Jinan (CN); Shanshan Xu, Jinan (CN); Bilian Qin, Jinan (CN); Yongguo Li, Jinan (CN); Xiangrui Kong, Jinan (CN); Jiaguo Wang, Jinan (CN)

(73) Assignees: Ocean University of China, Qingdao (CN); Shandong Academy of Environmental Sciences and Environmental Engineering Co., Ltd., Jinan (CN); Shandong Academy of Environmental Sciences Co., Ltd., Jinan (CN)

( * ) Notice: Subject to any disclaimer, the term of this patent is extended or adjusted under 35 U.S.C. 154(b) by 444 days.

(21) Appl. No.: 18/097,491

(22) Filed: Jan. 16, 2023

(65) Prior Publication Data
US 2023/0339793 A1  Oct. 26, 2023

(30) Foreign Application Priority Data

Apr. 25, 2022  (CN) .......................... 202210442864.3

(51) Int. Cl.
$C02F\ 3/32$ (2023.01)
$C02F\ 101/16$ (2006.01)

(52) U.S. Cl.
CPC .......... $C02F\ 3/327$ (2013.01); $C02F\ 2101/16$ (2013.01)

(58) Field of Classification Search
CPC .. C02F 3/327; C02F 2305/06; C02F 2101/16; C02F 2209/08; C02F 2209/16;
(Continued)

(56) References Cited

FOREIGN PATENT DOCUMENTS

| CN | 103936161 A | * | 7/2014 |
| CN | 104003520 A | * | 8/2014 |

(Continued)

OTHER PUBLICATIONS

Yang et al, English machine translation CN 103936161, pp. 1-10 (Year: 2014).*

(Continued)

*Primary Examiner* — Claire A Norris
(74) *Attorney, Agent, or Firm* — MATTHIAS SCHOLL P.C.; Matthias Scholl

(57) ABSTRACT

A system for controlling the amount of a liquid carbon source released to a constructed wetland, includes: a carbon source pool, a carbon source pipe, a peristaltic pump, a programmable logic controller (PLC), a computer, a first flow meter, a first chemical oxygen demand (COD) sensor, a first total nitrogen (TN) sensor, a second TN sensor, a second COD sensor, an inlet pipe, and an outlet pipe. The first flow meter, the first COD sensor, and the TN sensor are disposed on the inlet pipe; the second COD sensor and the second TN sensor are disposed on the outlet pipe; the inlet pipe and the outlet pipe are connected to the constructed wetland; the carbon source pipe is connected to the carbon source pool via the peristaltic pump; the computer, the (Continued)

peristaltic pump, the first flow meter, and all sensors are connected to the PLC controller.

2 Claims, 2 Drawing Sheets

(58) Field of Classification Search
CPC .......................... C02F 2209/22; C02F 3/006; C02F 2209/001; C02F 2209/003; C02F 2209/005
USPC ................................. 210/602, 614
See application file for complete search history.

(56) References Cited

FOREIGN PATENT DOCUMENTS

| CN | 109607770 | A | * | 4/2019 | ............... C02F 3/28 |
|----|-----------|---|---|--------|--------------------------|
| CN | 110515411 | B | * | 6/2020 | |
| CN | 111704244 | A | * | 9/2020 | |
| CN | 112266073 | A | * | 1/2021 | ............... C02F 3/28 |
| CN | 112759087 | A | * | 5/2021 | ............... C02F 3/32 |
| CN | 112794442 | A | * | 5/2021 | ............... C02F 3/28 |

OTHER PUBLICATIONS

Pei et al, English machine translation CN 104003520, pp. 1-6 (Year: 2014).*
Zhang et al, English machine translation CN 109607770, pp. 1-6 (Year: 2019).*
Wu et al, English machine translation CN 110515411, pp. 1-7 (Year: 2020).*
Zuo et al, English machine translation CN 111704244, pp. 1-3 (Year: 2020).*
Wang et al, English machine translation CN 112794442, pp. 1-15 (Year: 2021).*
Kong et al, English machine translation CN 112759087, pp. 1-9 (Year: 2021).*
Ren et al, English machine translation CN 112266073, pp. 1-9 (Year: 2021).*

* cited by examiner

SYSTEM AND METHOD FOR CONTROLING AMOUNT OF LIQUID CARBON SOURCE RELEASED TO CONSTRUCTED WETLAND

CROSS-REFERENCE TO RELATED APPLICATIONS

Pursuant to 35 U.S.C. § 119 and the Paris Convention Treaty, this application claims foreign priority to Chinese Patent Application No. 202210442864.3 filed Apr. 25, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of carbon source addition for treatment of slightly polluted water, and more particularly, to a system and method for controlling the amount of a liquid carbon source prepared from aquatic plants and released to a constructed wetland for purifying polluted water.

Three main metabolic processes that remove nitrogen pollution from a constructed wetland include ammonification, nitrification, and denitrification. Denitrification, in particular, is a critical factor for nitrogen removal in the constructed wetland.

Several factors determine the denitrification in the constructed wetland. These factors include quantity and type of the carbon source, temperature, dissolved oxygen (DO), potential of hydrogen (pH), hydraulic retention time (HRT) and the concentration of nitrate nitrogen in the influent; in practical engineering applications, these factors are difficult to control, so the denitrification efficiency is generally improved by manually adding the carbon source to the constructed wetland.

Organic carbon source is an essential substance that serves as an electron donor to reduce $NO_3$—N during microbial denitrification in constructed wetland. In most cases, tail water discharged from a wastewater treatment plant contains insufficient organic pollutants for denitrification in the constructed wetland. Therefore, the carbon source is added to the constructed wetland to increase the efficiency of nitrogen removal. Later studies revealed that when the wastewater has a ratio of $BOD_5$ to TN of greater than 3 or a ratio of $COD_{Cr}$ to TN of greater than 6, an additional carbon source is not required for the denitrification process; otherwise, it is required.

The carbon sources added to the constructed wetland include liquid and solid forms. The liquid carbon sources typically refer to conventional organic matter such as glucose, methanol, acetic acid, and domestic sewage; and the solid carbon sources typically refer to low-cost natural plants rich in cellulose substances and new biodegradable solid carbon sources.

The conventional carbon sources are rarely used as additives due to their price, toxicity and treatment technologies. The natural plants for preparation of carbon sources contain a large amount of lignocellulose which are only released to the environment through crushing, hydrolysis and modification.

SUMMARY

The disclosure provides a system and a method for controlling the amount of a liquid carbon source prepared from aquatic plants and released to a constructed wetland for purifying polluted water.

The method comprises calculating the amount of the liquid carbon source released to the constructed wetland according to following formula:

$$V=(Q*(5*(TN_{in}-TN_{out})-(COD_{in}-COD_{out}))/COD \text{ equivalent of carbon source from plant})/\rho;$$

where,

V is a volume of the liquid carbon source;

Q is a volume flow rate of the influent flowing into the constructed wetland (unit: $m^3/d$);

$TN_{in}$ is a concentration of total nitrogen (TN) in the influent flowing into the constructed wetland (unit: mg/L);

$TN_{out}$ is a concentration of total nitrogen in the qualified effluent flowing out of the constructed wetland (unit: mg/L);

$COD_{in}$ is a concentration of chemical oxygen demand (COD) in the influent flowing into the constructed wetland (unit: mg/L);

$COD_{out}$ is a concentration of COD in the qualified effluent flowing out of the constructed wetland (unit mg/L); and $\rho$ is a density of the liquid carbon source (unit: 1.0 g/mL);

when the influent has a ratio of $COD_{in}$ to $TN_{in}$ of equal to or less than 6, the carbon source is not an impact factor hindering denitrification in the constructed wetland, and thus the liquid carbon source is not released.

The system using the method for purifying polluted water comprises a carbon source pool, a carbon source pipe, a peristaltic pump, a PLC controller, a computer, a first flow meter, a first COD sensor, a first TN sensor, a second TN sensor, and a second COD sensor; the carbon source pipe is connected to the carbon source pool via the peristaltic pump; the computer, the peristaltic pump, the first flow meter, and all sensors are connected to the PLC controller.

The first flow meter is configured to measure the flow of the influent to the constructed wetland; the first COD sensor is configured to monitor the concentration of COD ($COD_{in}$) in the influent; the first TN sensor is configured to monitor the concentration of TN ($TN_{in}$) in the influent; the second TN sensor is configured to monitor the concentration of TN ($TN_{out}$) in the effluent; the second COD sensor is configured to monitor the concentration of COD ($COD_{out}$) in the effluent; the influent flow, $COD_{in}$, and $TN_{in}$ are key indexes for determining the amount of the liquid carbon source released to the constructed wetland.

The system further comprises a carbon source powder bag and a stirrer both disposed in the carbon source pool; the carbon source bag is used to hold a carbon source prepared from plants; the carbon source is then mixed with water and stirred thoroughly by the stirrer to form the liquid carbon source.

The system further comprises a second flow meter disposed on the carbon source pipe and connected to the PLC controller to monitor the flow of the liquid carbon source released to the constructed wetland.

The system further comprises a water temperature sensor, a DO sensor, a turbidity sensor, a pH sensor, and a conductivity sensor; the water temperature sensor is configured to measure the influent temperature; the DO sensor is configured to measure the amount of oxygen dissolved in the influent; the influent temperature and the DO concentration are key indexes for determining the ability of the constructed wetland to perform nitrification and denitrification, thereby analyzing the ability of the constructed wetland to remove nitrogen pollution; the turbidity sensor, the pH sensor, and the conductivity sensor are configured to monitor the turbidity, pH value, and the conductivity of the influent, respectively, which are auxiliary indexes for determining the influent quality of the constructed wetland.

In use, the carbon source pipe is disposed in a water distribution channel in the constructed wetland; the liquid carbon source is evenly distributed in the carbon source pool disposed on one end of the constructed wetland; the second flow meter is used to monitor the amount of the liquid carbon source released to the constructed wetland, thereby facilitating analysis of the operating conditions of the system. The aquatic plant straws are gathered from the constructed wetland, ground into powders, and soaked in the carbon source pool; the resulting mixture is passed through a filter so that the liquid carbon source is separated from the carbon residues; the carbon residues is useful for preparation of a biochar filler. The liquid carbon source is pumped out of the carbon source pool by the peristaltic pump and flows into the constructed wetland via the carbon source pipe. The PLC controller receives the data from the first flow meter, the first COD sensor, the first TN sensor, the second TN sensor and the second COD sensor, and sends the data to the computer to calculate a preset volume (V) of the liquid carbon source to be released to the constructed wetland; the PLC controller receives the preset volume and controls the operation of the regulating valve and the peristaltic pump, so that the preset volume (V) of the liquid carbon source is added to the constructed wetland via the carbon source pipe. Additionally, the computer can read the data from an online monitoring device that monitors the flow, TN concentration and COD concentration of the influent in real time, thereby analyzing the influent quality of the constructed wetland and modifying the operating parameters for an increased effluent quality.

The disclosure analyses the changes in the quality and flow of the influent to control the amount of the liquid carbon source released to the constructed wetland, thereby driving the nitrogen removal requirement higher. The disclosure further calculates the volume of the liquid carbon source to precisely control the water quality and avoid the waste of the liquid carbon source.

Figure 1:
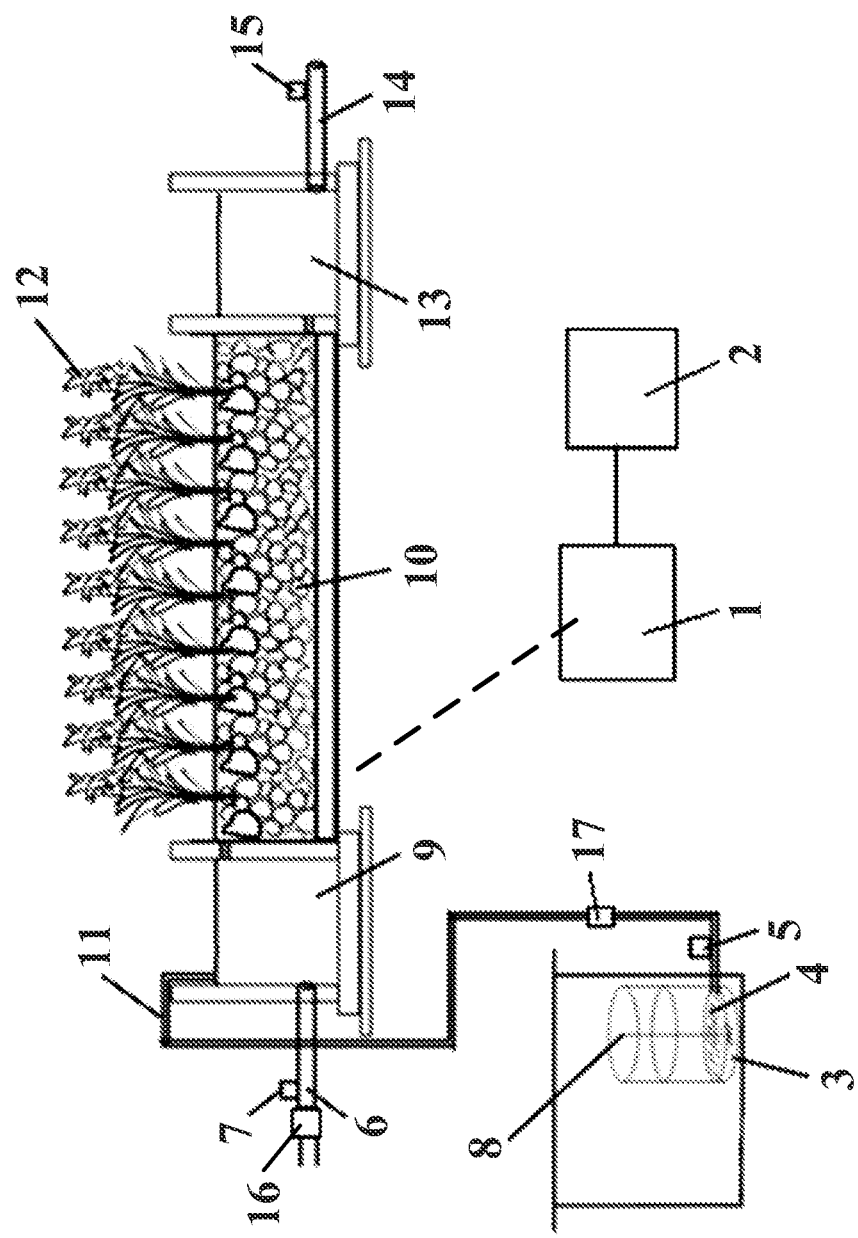
FIG. 1 is a schematic diagram of a system for controlling the amount of a liquid carbon source released to a constructed wetland for purifying polluted water according to one embodiment of the disclosure.

In the drawings, the following reference numbers are used: 1. PLC controller; 2. Computer; 3. Carbon source pool; 4. Carbon source powder bag; 5. Peristaltic pump; 6. Inlet pipe; 7. First water quality sensor; 8. Stirrer; 9. Water distribution channel; 10. Wetland pool; 11. Carbon source pipe; 12. Wetland plants; 13. Water catchment channel; 14. Outlet pipe; 15. Second water quality sensor; 16. First flow meter; and 17. Second flow meter.

DETAILED DESCRIPTION

The disclosure gathers aquatic plants from the constructed wetland to prepare a liquid carbon source and provides a system by which a desired volume of the liquid carbon source is calculated and added to the constructed wetland for purifying polluted water.

Referring to FIG. 1, the system comprises a carbon source pool 3, a carbon source pipe 11, a peristaltic pump 5, a PLC controller 1, a computer 2, a first flow meter 16, a first water quality sensor 7, a second water quality sensor 15, a second flow meter 17, a carbon source powder bag 4 and a stirrer 8. The carbon source pipe 11 is connected to the carbon source pool 3 via the peristaltic pump 5. The second flow meter 17 is disposed on the carbon source pipe 11 to monitor the volume of the liquid carbon source released to the constructed wetland. The carbon source bag is used to hold a carbon source prepared from plants. The carbon source is then mixed with water and stirred thoroughly by the stirrer to form the liquid carbon source. The disclosure designs a submerged surface flow constructed wetland for use in combination with the system to precisely control the amount of the liquid carbon source. The artificial wetland comprises a wetland pool 10, wetland plants 12, a water distribution channel 9, a water catchment channel 13, an inlet pipe 6, an outlet pipe 14; the wetland plants 12 are arranged in the wetland pool 10; the water distribution channel 9 and the water catchment channel 13 are disposed on both ends of the wetland pool 10; the water distribution channel 9 comprises a side wall on which the inlet pipe 6 is disposed; the water catchment channel 13 comprises a side wall on which the outlet pipe 14 is disposed on; the first flow meter 16 and the first water quality sensor 7 are disposed on the inlet pipe 6; the first water quality sensor 7 comprises a first COD sensor and a TN sensor configured to monitor the concentrations of COD and TN in the influent, respectively; the second water quality sensor 15 is disposed on the outlet pipe 14 and comprises a second COD sensor and a second TN sensor configured to monitor the COD and TN in the effluent, respectively. The computer 2, the peristaltic pump 5, the second flow meter 17, the first flow meter 16, and all sensors are connected to the PLC controller 1.

The first flow meter is configured to measure the flow of the influent flowing into the constructed wetland; the first COD sensor is configured to monitor the concentration of COD ($COD_{in}$) in the influent; the first TN sensor is configured to monitor the concentration of TN ($TN_{in}$) in the influent; the second TN sensor is configured to monitor the concentration of TN ($TN_{out}$) in the effluent; the second COD sensor is configured to monitor the concentration of COD ($COD_{out}$) in the effluent.

The system further comprises a water temperature sensor, a DO sensor, a turbidity sensor, a pH sensor, and a conductivity sensor, all of which are disposed in the water distribution channel 9 and connected to the PLC controller 1; the water temperature sensor is configured to measure the influent temperature; the DO sensor is configured to measure the amount of DO in the influent; the influent temperature and the DO concentration are key indexes for determining the ability of the constructed wetland to perform nitrification and denitrification, thereby analyzing the ability of the constructed wetland to remove contaminations; the turbidity sensor, the pH sensor, and the conductivity sensor are configured to monitor the turbidity, pH value, and the conductivity of the influent, respectively, which are auxiliary indexes for determining the influent quality of the constructed wetland.

Figure 2:
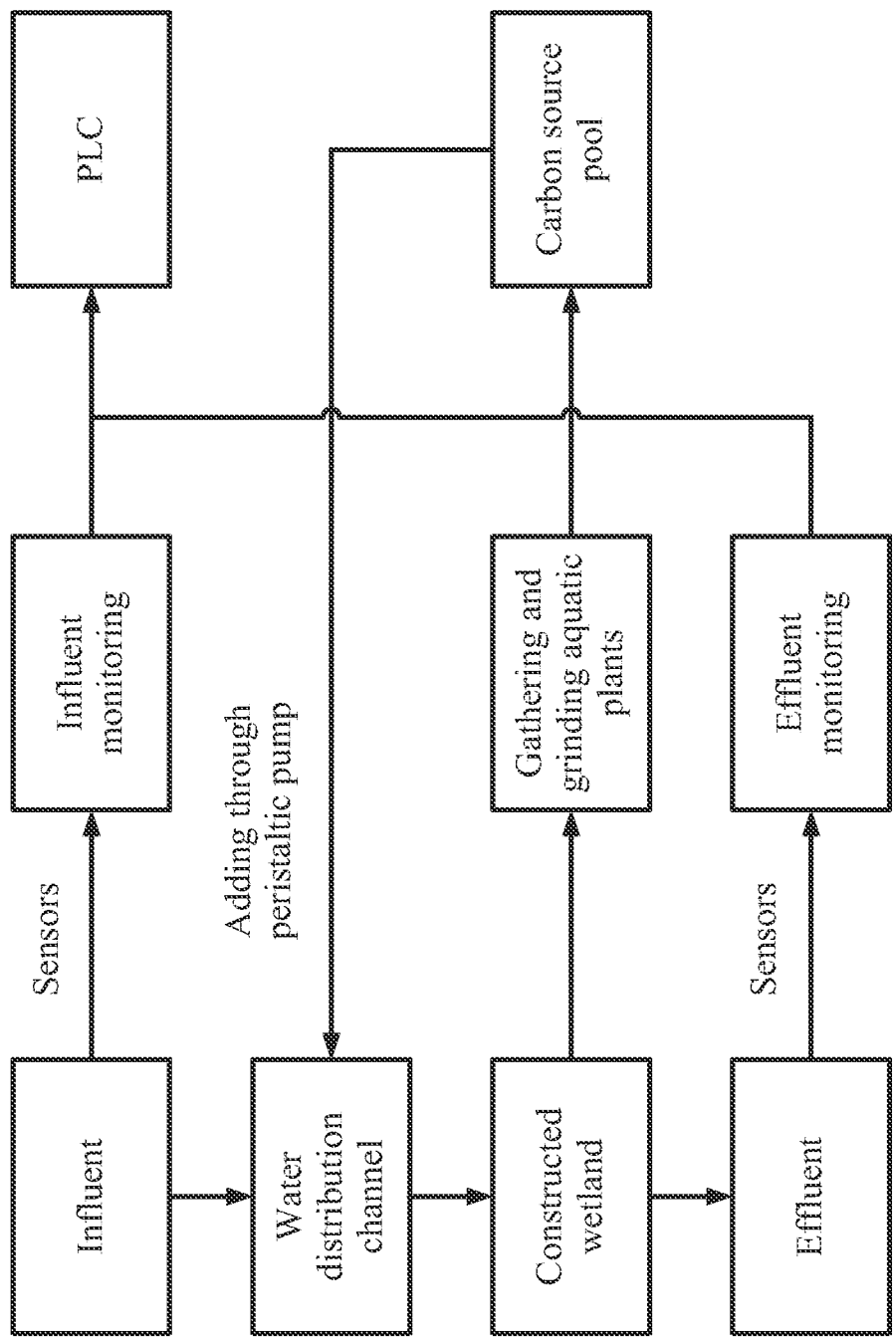
FIG. 2 is a flow chart of a method for controlling the amount of a liquid carbon source prepared from aquatic plants and released to a constructed wetland for purifying polluted water according to one embodiment of the disclosure.

FIG. 2 is a flow chart illustrating a precise control of the amount of a liquid carbon source released to a constructed wetland. The following more details are described by reference to FIGS. 1 and 2.

Rural wastewater was treated and discharged to the constructed wetland for high-level treatment. The constructed wetland was 200 m³/d in size. The effluent quality of the constructed wetland should meet the emission requirements issued by "Environmental Quality Standards for Surface Water" (GB3838-2002).

The water quality of the constructed wetland was determined as follows:

TABLE 1

Indexes of influent and effluent of constructed wetland

| Contaminant | $COD_{Cr}$ mg/L | TN mg/L |
|---|---|---|
| Influent quality | 25 | 6.5 |
| effluent quality | 20 | 1.0 |

1. Preparation a Liquid Carbon Source from Aquatic Plants in Constructed Wetland Common aquatic plants such as reed, yellow calamus, shallot and calamus, were gathered from the constructed wetland and ground into powders with a length of 1-1.5 cm and a width of 0.3-0.5 cm by a pulverizer. The carbon source powder bag 4 was disposed in the carbon source pool; the powders were placed in the carbon source powder bag 4; the water was added to the carbon source pool to soak the powders; the amount of the carbon source pool was 50 L; according to the laboratory test results, an optimal solubility of a carbon source in water was achieved by soaking 500 g of the powders in the water for 24 hours and thoroughly mixing the mixture by the stirrer 8.

2. Determination of the Amount of the Liquid Carbon Source

The influent quality was monitored and analyzed to determine $COD_{in}$ of 25 mg/L and $TN_{in}$ of 6.5 mg/L. When $COD_{in}/TN_{in}$ was less than 6, the carbon source was considered a major factor affecting denitrification in the constructed wetland. The PLC controller 1 controlled the peristaltic pump 5 to pump the liquid carbon source into the constructed wetland.

The computer 2 used formulas to determine that the effluent quality met the emission requirements issued by "Environmental Quality Standards for Surface Water" (GB3838-2002). According to the engineering experience, the density of the liquid carbon source was estimated to be 1000 kg/m³; the COD equivalent of the liquid carbon source from aquatic plants (such as yellow calamus) was estimated to be 0.159 (g·COD)/g; and the amount of the liquid carbon source released to the constructed wetland was calculated as follows:

$$V = (Q^*(5^*(TN_{in} - TN_{out}) - (COD_{in} - COD_{out}))/COD$$

equivalent of plant carbon source$)/\rho$;

$= (200 \text{ m}^3/d * (5 \text{ g/m}^3(*6.5 - 10) -$ $(25)20 \text{ g/m}^3)/0.159(g. COD)/g)/\rho =$ $28301 \text{ mL} \approx 28.3 \text{ L}$ The volume calculated was input to the PLC controller 1 by the computer 2, and the PLC controller 1 controlled the peristaltic pump 5 to pump the liquid carbon source into the constructed wetland.

According to the engineering experience, the maximum volume ($V_{max}$) of the carbon source pool was 50 L.

When the volume (V) of the liquid carbon source was greater than or equal to the maximum volume ($V_{max}$) of the carbon source pool, the amount of the liquid carbon source released to the constructed wetland was controlled to be 50 L by the PLC controller.

3. Release of the Liquid Carbon Source to the Constructed Wetland 28.3 L of the liquid carbon source was released to the constructed wetland a day. The peristaltic pump 5 offered a flow rate of greater than or equal to 28.3 L/d (i.e. 19.65 mL/min). The liquid carbon source was pumped through the water distribution channel 9 and directed into the constructed wetland.

4. Effluent Quality Monitoring

The hydraulic retention time was 0.87 d; the liquid carbon source was released at time T0; the denitrification started to occur at time T1; T1=T0+0.87 d; the sludge age for denitrification in the subsurface flow constructed wetland was 3 d according to engineering experience and literature data; the denitrification stopped at T2; T2=T0+0.87 d+3 d.

The effluent quality was monitored at T0, T1 and T2; when the TN in the effluent was not removed to a low concentration after T2 and the ratio of $COD_{Cr}$ to TN was equal to or lower than 6, the computer 2 repeated the step 2 and the liquid carbon source was then released to the constructed wetland.

It will be obvious to those skilled in the art that changes and modifications may be made, and therefore, the aim in the appended claims is to cover all such changes and modifications.

What is claimed is:

1. A method for controlling an amount of a liquid carbon source released to a constructed wetland for treatment of polluted water using a system, the system comprising:

a carbon source pool, a carbon source pipe, a peristaltic pump, a programmable logic controller (PLC), a computer, a first flow meter, a first chemical oxygen demand (COD) sensor, a first total nitrogen (TN) sensor, a second TN sensor, a second COD sensor, an inlet pipe, and an outlet pipe; wherein:

the first flow meter, the first COD sensor, and the TN sensor are disposed on the inlet pipe; the second COD sensor and the second TN sensor are disposed on the outlet pipe; the inlet pipe and the outlet pipe are connected to the constructed wetland; the carbon source pipe is connected to the carbon source pool via the peristaltic pump; the computer, the peristaltic pump, the first flow meter, and all sensors are connected to the PLC; and the first flow meter is configured to measure a flow of an influent to the constructed wetland; the first COD sensor is configured to monitor a concentration of COD in the influent ($COD_{in}$); the first TN sensor is configured to monitor a concentration of TN in the influent ($TN_{in}$); the second TN sensor is configured to monitor a concentration of TN in an effluent from the constructed wetland ($TN_{out}$); and the second COD sensor is configured to monitor a concentration of COD in the effluent ($COD_{out}$);

the method comprising:

S1. disposing the carbon source pipe in a water distribution channel in the constructed wetland;

S2. gathering aquatic plant straws from the constructed wetland; grinding the aquatic plant straws into powders; and soaking the powders in the carbon source pool; passing a resulting mixture through a filter so that the liquid carbon source is separated from carbon residues;

S3. receiving, by the PLC, data from the first flow meter, the first COD sensor, the first TN sensor, the second TN sensor, and the second COD sensor; and sending the data to the computer to calculate a preset volume (V) of the liquid carbon source to be released to the constructed wetland;

S4. calculating the preset volume (V) of the liquid carbon source released to the constructed wetland according to following formula:

$$V=(Q*(5*(TN_{in}-TN_{out})-(COD_{in}-COD_{out}))/COD \text{ equivalent of carbon source from plant})/\rho;$$

wherein:

V is a volume of the liquid carbon source;

Q is a volume flow rate of the influent flowing into the constructed wetland (unit: m³/d);

$\rho$ is a density of the liquid carbon source (unit: 1.0 g/mL);

when the influent has a ratio of $COD_{in}$ to $TN_{in}$ of greater than 6, the carbon source is not an impact factor hindering denitrification in the constructed wetland, and thus the liquid carbon source is not released; and S5. sending the preset volume to the PLC; and controlling, by the PLC, operations of the peristaltic pump and a regulating valve connected to the peristaltic pump, so that the preset volume (V) of the liquid carbon source is added to the constructed wetland via the carbon source pipe; and monitoring, by a second flow meter disposed on the carbon source pipe and connected to the PLC, the flow of the liquid carbon source released to the constructed wetland.

2. The method of claim 1, wherein the computer acquires the data from an online monitoring device that monitors the flow, $TN_{in}$, and $COD_{in}$ in real time.

* * * * *